United States Patent
Sarkar

(10) Patent No.: US 8,634,333 B2
(45) Date of Patent: Jan. 21, 2014

(54) BUNDLING OF ACK INFORMATION IN A WIRELESS COMMUNICATION SYSTEM

(75) Inventor: Sandip Sarkar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 219 days.

(21) Appl. No.: 12/435,717

(22) Filed: May 5, 2009

(65) Prior Publication Data
US 2009/0279460 A1 Nov. 12, 2009

Related U.S. Application Data

(60) Provisional application No. 61/051,296, filed on May 7, 2008.

(51) Int. Cl.
*H04B 7/005* (2006.01)

(52) U.S. Cl.
USPC .............. 370/278; 370/280; 714/749

(58) Field of Classification Search
USPC ......... 370/277, 278, 280, 313, 314, 321, 332, 370/336, 337, 341, 442, 474, 476, 477; 709/229, 231, 232, 236; 455/450, 24, 455/509, 445; 714/748, 749
See application file for complete search history.

(56) References Cited

U.S. PATENT DOCUMENTS

| | | | |
|---|---|---|---|
| 7,002,923 B2 * | 2/2006 | Golitschek et al. | 714/749 |
| 7,158,802 B2 | 1/2007 | Dick et al. | |
| 7,929,590 B2 | 4/2011 | Cho et al. | |
| 2003/0014709 A1 * | 1/2003 | Miyoshi et al. | 714/748 |
| 2007/0195740 A1 | 8/2007 | Bhushan et al. | |
| 2007/0260956 A1 * | 11/2007 | Terry et al. | 714/748 |
| 2008/0086669 A1 * | 4/2008 | Cheng et al. | 714/748 |
| 2008/0159183 A1 * | 7/2008 | Lindoff et al. | 370/278 |
| 2009/0098876 A1 * | 4/2009 | Khan et al. | 455/445 |

(Continued)

FOREIGN PATENT DOCUMENTS

| | | |
|---|---|---|
| CN | 1428026 A | 7/2003 |
| CN | 101094114 A | 12/2007 |

(Continued)

OTHER PUBLICATIONS

Ericsson: "Combination of ACK/NACKs for TDD" 3GPP Draft; R1-080870, 3rd Generation Partnership Project (3GPP), Mobile Competence Centre; 620, Route Des Lucioles; F-06921 Sophia-Antipolis Cedex; France, vol. RAN WG1, no. Sorrento, Italy; 20080206, Feb. 6, 2008, XP050109347.

(Continued)

*Primary Examiner* — Jeffrey M Rutkowski

(57) ABSTRACT

Techniques for bundling acknowledgement (ACK) information in a wireless communication system are described. In one design, a user equipment (UE) may receive multiple codewords in at least one downlink subframe. The UE may decode the multiple codewords and determine an ACK or a negative acknowledgement (NACK) for each codeword based on decoding result. The UE may bundle the ACKs and NACKs for the multiple codewords to obtain bundled ACK information. In one design, the UE may generate (i) a bundled ACK if ACKs are obtained for all codewords or (ii) a bundled NACK if a NACK is obtained for any codeword. The UE may send the bundled ACK information as feedback for the multiple codewords. The UE may receive retransmissions of the multiple codewords if a bundled NACK is sent and may receive new codewords if a bundled ACK is sent.

36 Claims, 6 Drawing Sheets

(56) References Cited

U.S. PATENT DOCUMENTS

| 2009/0196204 | A1* | 8/2009 | Astely et al. | 370/280 |
|---|---|---|---|---|
| 2009/0213769 | A1* | 8/2009 | Shen et al. | 370/280 |
| 2009/0241004 | A1* | 9/2009 | Ahn et al. | 714/749 |
| 2010/0272048 | A1* | 10/2010 | Pan et al. | 370/329 |
| 2010/0325508 | A1* | 12/2010 | Hu et al. | 714/749 |

FOREIGN PATENT DOCUMENTS

| DE | 10227852 A1 | 1/2004 |
|---|---|---|
| EP | 1515474 A2 | 3/2005 |
| EP | 1855408 A1 | 11/2007 |
| JP | 2009540729 A | 11/2009 |
| RU | 2320087 | 3/2008 |
| WO | 2006066861 A1 | 6/2006 |
| WO | 2007145492 A2 | 12/2007 |
| WO | WO2008006088 | 1/2008 |
| WO | 2009099389 A1 | 8/2009 |
| WO | 2009116760 A2 | 9/2009 |

OTHER PUBLICATIONS

Ericsson: "Details of ACK/NAK bundling for TDD" 3GPP Draft; R1-081528, 3RD Generation Partnership Project (3GPP), Mobile Competence Centre; 650, Route Des Lucioles ; F-06921 Sophia-Antipolis Cedex; France, vol. RAN WG1, no. Shenzhen, China; 20080327, Mar. 27, 2008, XP050109942.
Ericsson: "Details of ACK/NAK bundling for TDD" 3 GPPP Draft; R1-081566, 3rd Generation Partnership Project (3GPP), Mobile Competence Centre; 650, Route Des Lucioles ; F-06921 Sophia-Antipolis Cedex; France, vol. RAN WG1, no. Shenzhen, China; 20080330, Mar. 30, 2008, XP050109981.
Harri Holma, Antti Toskala: "LTE for UMTS—OFDMA and SC-FDMA Based Radio Access, [part : Chapter 12]" [Online] Apr. 2, 2009, John Wiley & Sons, LTD., United Kingdom, XP002549277.
Harri Holma, Antti Toskala: "LTE for UMTS—OFDMA and SC-FDMA Based Radio Access, [part: Front Matter]" [Online] Apr. 2, 2009, John Wiley & Sons, LTD., United Kingdom, XP002549276.
Huawei: "Consideration on ACK/NACK bundling and Multi-ACK/NACK multiplexing in TDD" 3GPP Draft; R1-081790, 3RD Generation Partnership Project (3GPP), Mobile Competence Centre; 650, Route Des Lucioles; F-06921 Sophia-Antipolis Cedex; France, [Online] vol. RAN WG1, no. Kansas City, USA; 20080514, Apr. 29, 2008, XP002549272.

International Search Report and Written Opinion—PCT/US2009/043087, International Search Authority—European Patent Office—Oct. 23, 2009 (081406WO).
LG Electronics "Bundled ACK/NACK i n TDD" 3GPP Draft; R1-081815 TDD ACK/NACK Bundling: 3RD Generation Partnership Project (3GPP), Mobile Competence Centre; 650, Route Des Lucioles; F-06921 Sophia-Antipolis Cedex ; France, [Online] vol. RAN WG1, no. Kansas City, USA; 20080514, Apr. 29, 2008, XP002549273.
LG Electronics: "CCE to bundled ACK/NACK index mapping i n TDD" 3GPP Draft; R1-081816 TDD ACKNACK Index Mapping, 3RD Generation Partnership Project (3GPP), Mobile Competence Centre; 650, Route Des Lucioles ; F-06921 Sophia-Antipolis Cedex; France, [Online] vol. RAN WG1, no. Kansas City, USA; 20080514, Apr. 29, 2008, XP002549335.
Nokia et al: "Downlink scheduling for ACK/NACK bundling" 3GPP Draft; R1-081452, 3rd Generation Partnership Project (3GPP), Mobile Competence Centre ; 650, Route Des Luciole ; F-06921 Sophia-Antipolis Cedex; France, vol. RAN WG1, no. Shenzhen, China; 20080326, Mar. 26, 2008, XP050109869.
Rahman M I et al: "Link Level Investigation of ACK/NACK Bundling for LTE TDD" 2009 IEEE 69th Vehicular Technology Conference; Apr. 26-29, 2009, Barcelona, Spain, IEEE, Piscataway, NJ, USA, Apr. 26, 2009, pp. 1-5, XP031474594.
Rohde & Schwarz: "UMTS Long Term Evolution (LTE) Technology Introduction" Application Notes, [Online] Jan. 11, 2008, pp. 1-55, XP002549275.
TD Tech: "ACK/NACK Multiplexing in PUSCH in TDD" 3GPP Draft; R1-081339, 3rd Generation Partnership Project (3GPP), Mobile Competence Centre; 650, Route Des Lucioles ; F-06921 Sophia-Antipolis Cedex ; France, vol. RAN WG1, no. Shenzhen, China; 20080326, Mar. 26, 2008, XP050109764.
Texas Instruments: "ACK/NAK DTX Detection with ACK/NAK Bundling in TDD" 3GPP Draft; R1-081985, 3rd Generation Partnership Project (3GPP), Mobile Competence Centre; 650, Route Des Lucioles; F-06921 Sophia-Antipolis Cedex; France, [Online] vol. RAN WG1, no. Kansas City, USA; 20080514, Apr. 29, 2008, XP002549274.
Samsung: "ACK/NAK DTX Detection in the PUSCH", 3GPP TSG RAN WG1 #52; R1-080676, Sorrento, Italy, Feb. 11-15, 2008.
Ericsson, Motorola, Nokia, Nokia Siemens Networks, Qualcomm: "Multiple ACK/NAK for TDD", 3GPP Draft TSG-RAN WG1 #52 R1-081110, Feb. 11-15, 2008.
Taiwan Search Report—TW098115186—TIPO—Mar. 12, 2013 (081406TW).

* cited by examiner

BUNDLING OF ACK INFORMATION IN A WIRELESS COMMUNICATION SYSTEM

The present application claims priority to provisional U.S. Application Ser. No. 61/051,296, entitled "ACK/NAK REPORTING IN ASYMMETRIC TDD IN LTE," filed May 7, 2008, assigned to the assignee hereof and incorporated herein by reference.

BACKGROUND

I. Field

The present disclosure relates generally to communication, and more specifically to techniques for sending acknowledgement (ACK) information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may communicate with a user equipment (UE) on the downlink and uplink. The downlink (or forward link) refers to the communication link from the base station to the UE, and the uplink (or reverse link) refers to the communication link from the UE to the base station. The base station may send data to the UE. The UE may receive and process the data from the base station and may send ACK information to the base station. The base station may determine whether to resend the data or to send new data to the UE based on the ACK information. It is desirable to efficiently send the ACK information.

SUMMARY

Techniques for bundling ACK information in a wireless communication system are described herein. The techniques may be used to reduce the amount of ACK information to report and may be especially applicable in a time division duplexed (TDD) system with an asymmetric downlink-uplink configuration.

In one design of data transmission on the downlink, a UE may receive multiple codewords in at least one downlink subframe. Each codeword may be encoded separately by a base station and may be decoded separately by the UE. The UE may decode the multiple codewords and may determine an acknowledgement (ACK) or a negative acknowledgement (NACK) for each codeword based on decoding result for the codeword. The UE may bundle the ACKs and NACKs for the multiple codewords to obtain bundled ACK information. The UE may send the bundled ACK information as feedback for the multiple codewords.

In one design, the bundled ACK information may comprise a single bundled ACK/NACK for the multiple codewords. The UE may perform bundling with a logical AND operation on the ACKs and NACKs for the multiple codewords. The UE may generate (i) a bundled ACK if ACKs are obtained for all codewords or (ii) a bundled NACK if a NACK is obtained for any codeword. The UE may receive retransmissions of the multiple codewords if a bundled NACK is sent to the base station and may receive new codewords if a bundled ACK is sent.

In another design, the bundled ACK information may comprise multiple bundled ACKs/NACKs for multiple sets of codewords formed with the multiple codewords. Each bundled ACK/NACK may comprise a bundled ACK or a bundled NACK for one set of codewords. The UE may determine the bundled ACK/NACK for each set of codewords based on the ACKs and NACKs for the codewords in that set. The UE may receive retransmission of each set of codewords for which a bundled NACK is sent. The UE may receive a new set of codewords for each set of codewords for which a bundled ACK is sent.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

The techniques described herein may also be used for data transmission on the downlink as well as the uplink. For clarity, certain aspects of the techniques are described below for data transmission on the downlink, with ACK information being sent on the uplink.

Figure 1:
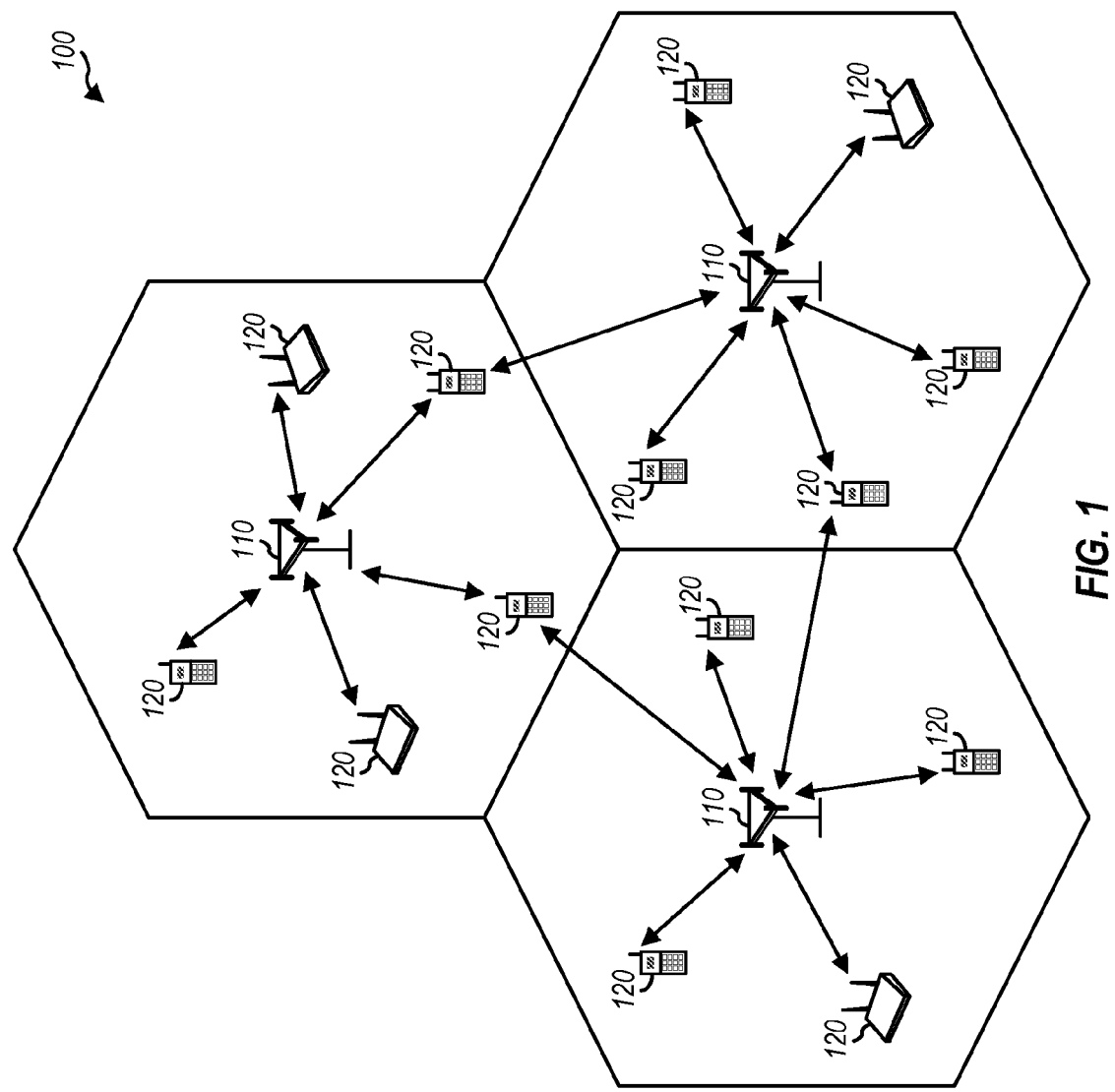
FIG. 1 shows a wireless communication system.

FIG. 1 shows a wireless communication system 100, which may be an LTE system or some other system. System 100 may include a number of evolved Node Bs (eNBs) 110 and other network entities. An eNB may be a station that communicates with the UEs and may also be referred to as a Node B, a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc.

The system may utilize time division duplexing (TDD). For TDD, the downlink and uplink share the same frequency channel, which may be used for the downlink some of the time and for the uplink some other time.

Figure 2:
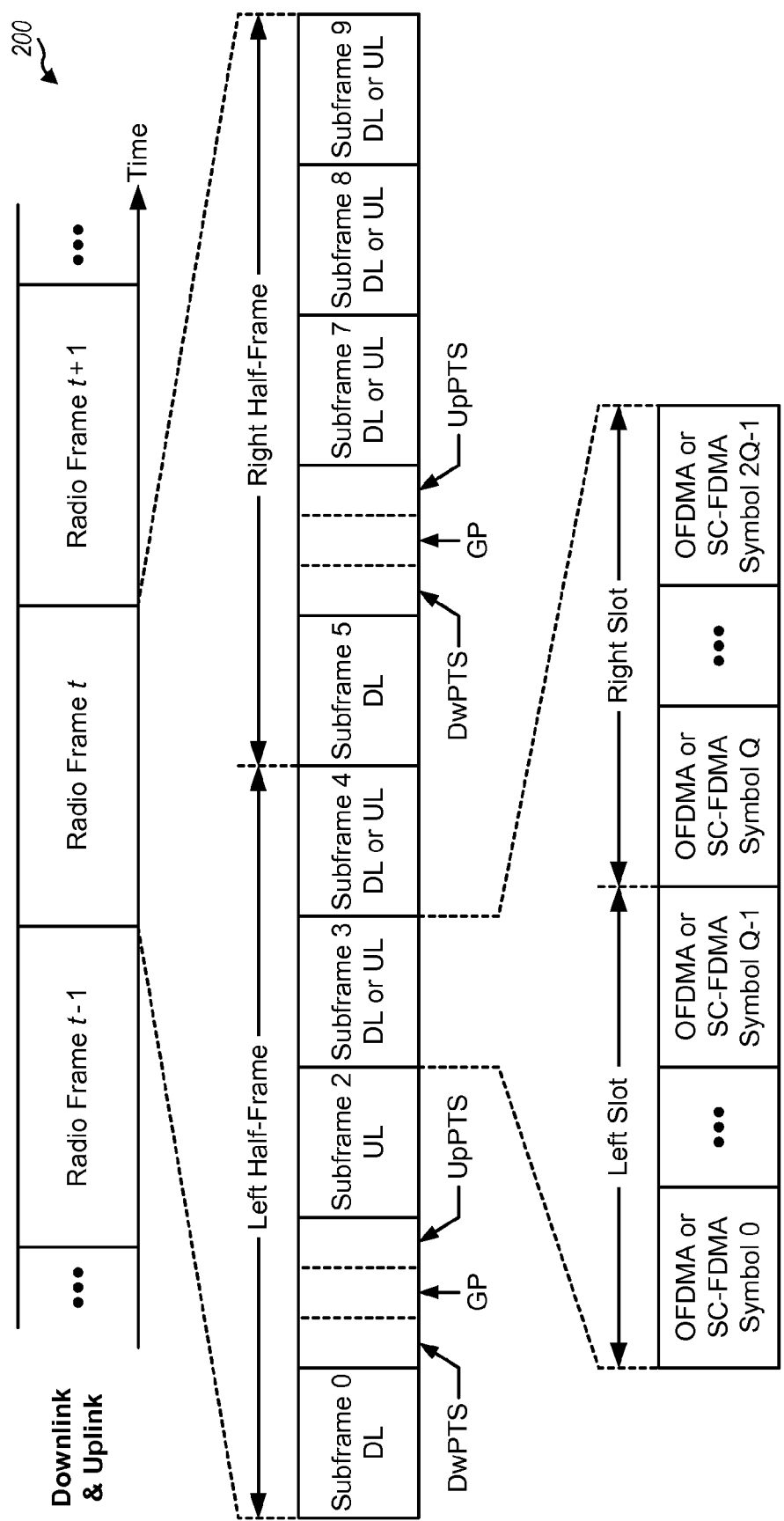
FIG. 2 shows an exemplary frame structure for a TDD system.

FIG. 2 shows an exemplary frame structure 200 that may be used for a TDD system. The transmission timeline may be partitioned into units of radio frames. Each radio frame may have a predetermined duration, e.g., 10 milliseconds (ms), and may be partitioned into two half-frames. Each radio frame may also be partitioned into 10 subframes with indices 0 through 9. Each subframe usable for data transmission may be partitioned into two slots. Each slot may include Q symbol periods, e.g., Q=6 symbol periods for an extended cyclic prefix or Q=7 symbol periods for a normal cyclic prefix. One OFDMA symbol or one SC-FDMA symbol may be sent in each symbol period.

Table 1 lists seven downlink-uplink configurations supported by LTE for TDD. Subframes 0 and 5 may be used for the downlink for all downlink-uplink configurations and are denoted as "DL" in FIG. 2 and "D" in Table 1. Subframe 2 may be used for the uplink for all downlink-uplink configurations and is denoted as "UL" in FIG. 2 and "U" in Table 1. Subframes 3, 4, 7, 8 and 9 may each be used for the downlink or uplink depending on the downlink-uplink configuration. Subframe 1 may be a special subframe (denoted as "S" in Table 1) with three special fields composed of a downlink pilot time slot (DwPTS), a guard period (GP), and an uplink pilot time slot (UpPTS). Subframe 6 may be (i) a special subframe with only the DwPTS or all three special fields or (ii) a downlink subframe, depending on the downlink-uplink configuration. The DwPTS, GP, and DwPTS fields may have different durations for different special subframe configurations.

A subframe used for the downlink may be referred to as a downlink subframe. A subframe used for the uplink may be referred to as an uplink subframe. Table 1 gives the number of downlink subframes (#D), the number of uplink subframes (#U), and the number of special subframes (#S) in each radio frame for each downlink-uplink configuration. 2Q OFDM symbols may be sent in each downlink subframe, and 2Q SC-FDMA symbols may be sent in each uplink subframe, as shown in FIG. 2.

TABLE 1

Downlink-Uplink Configurations

| DL:UL Configuration | Switch-point Periodicity | Subframe Number | | | | | | | | | | #D | #U | #S | N:M |
|---|---|---|---|---|---|---|---|---|---|---|---|---|---|---|---|
| | | 0 | 1 | 2 | 3 | 4 | 5 | 6 | 7 | 8 | 9 | | | | |
| 0 | 5 ms | D | S | U | U | U | D | S | U | U | U | 2 | 6 | 2 | 1:3 |
| 1 | 5 ms | D | S | U | U | D | D | S | U | U | D | 4 | 4 | 2 | 1:1 |
| 2 | 5 ms | D | S | U | D | D | D | S | U | D | D | 6 | 2 | 2 | 3:1 |
| 3 | 10 ms | D | S | U | U | U | D | D | D | D | D | 6 | 3 | 1 | 2:1 |
| 4 | 10 ms | D | S | U | U | D | D | D | D | D | D | 7 | 2 | 1 | 7:2 |
| 5 | 10 ms | D | S | U | D | D | D | D | D | D | D | 8 | 1 | 1 | 8:1 |
| 6 | 10 ms | D | S | U | U | U | D | S | U | U | D | 3 | 5 | 2 | 3:5 |

A number of N:M configurations may be supported for the downlink and uplink. For a given N:M configuration, a downlink-uplink cycle may include N downlink subframes and M uplink subframes, where in general N≥1, M≥1, and N may or may not be equal to M. Asymmetry in the downlink and uplink exists when N is not equal to M. A downlink-uplink cycle may span 5 ms for downlink-uplink configurations 0 to 2 or may span 10 ms for downlink-uplink configurations 3 to 6. The last column of Table 1 gives the N:M configuration for each downlink-uplink configuration. The following N:M configurations may be supported:

Symmetric: 1:1—equal number of downlink subframes and uplink subframes,

Downlink heavy: 2:1, 3:1, 7:2 and 8:1—more downlink subframes than uplink subframes, and Uplink heavy: 1:3 and 3:5—more uplink subframes than downlink subframes.

A 9:1 configuration may be obtained for downlink-uplink configuration 5 by configuring special subframe 1 to include mostly DwPTS and minimal GP and UpPTS.

The system may support hybrid automatic repeat request (HARQ). For HARQ on the downlink, an eNB may process a transport block (or packet) to obtain a codeword (or coded packet). The eNB may then send a transmission of the codeword to a UE and may send one or more additional transmissions until the codeword is decoded correctly by the UE, or the maximum number of transmissions has been sent, or some other termination condition is encountered. The first transmission of the codeword may be referred to as a new transmission, and each additional transmission of the codeword may be referred to as a retransmission. After each transmission of the codeword, the UE may decode all received transmissions of the codeword to attempt to recover the codeword.

Figure 3:
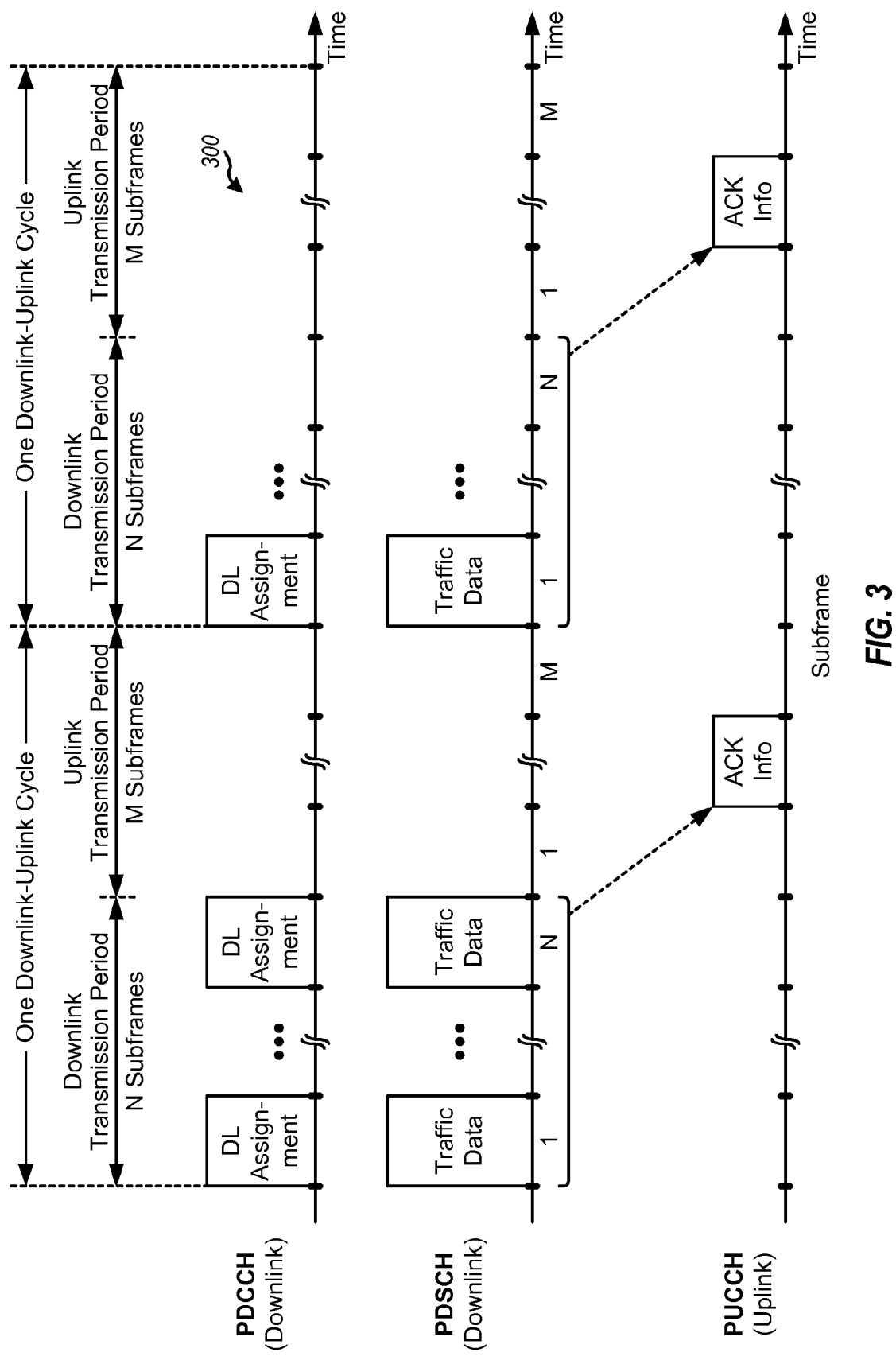
FIG. 3 shows exemplary data transmission on the downlink with HARQ.

FIG. 3 shows exemplary data transmission on the downlink with HARQ. Each downlink-uplink cycle may include a downlink transmission period covering N downlink subframes and an uplink transmission period covering M uplink subframes. In one design, an eNB may send data in up to N downlink subframes of a downlink transmission period, and a UE may send ACK information for the data in one uplink subframe of the following uplink transmission period.

The UE may periodically estimate the downlink channel quality for the eNB and may send channel quality indicator (CQI) information on a physical uplink control channel (PUCCH) to the eNB. The eNB may use the CQI information and/or other information to schedule the UE for downlink data transmission and to select a modulation and coding scheme (MCS) for the UE. For each downlink subframe in which the UE is scheduled, the eNB may process L transport blocks (or packets) to obtain L codewords, where L≥1, and may send the L codewords on a physical downlink shared channel (PDSCH) to the UE. The eNB may also send a downlink assignment for the UE on a physical downlink control channel (PDCCH) in each subframe in which the UE is scheduled (as shown in FIG. 3) or in only the first subframe. The eNB may send no downlink assignment and no codewords to the UE in each downlink subframe in which the UE is not scheduled.

The UE may process the PDCCH in each downlink subframe to obtain a downlink assignment, if any, sent to the UE. If a downlink assignment is received, then the UE may process the PDSCH and decode the L codewords sent to the UE. For each codeword, the UE may provide an ACK if the codeword is decoded correctly or a NACK if the codeword is decoded in error. The UE may generate ACK information based on the ACKs and NACKs for all codewords, as described below, and may send the ACK information on the PUCCH to the eNB. The eNB may send a retransmission of each codeword for which a NACK is received and may send a transmission of a new codeword for each codeword for which an ACK is received.

A number of HARQ processes may be defined for each of the downlink and uplink. An HARQ process may carry all transmissions of a codeword until the codeword is decoded correctly and may then carry transmissions of another codeword. A new codeword may be sent on an HARQ process when that process becomes available. The number of HARQ processes for each link may be dependent on (i) the number of downlink subframes and the number of uplink subframes in each downlink-uplink cycle and (ii) the required processing time at a receiver for each codeword. For example, if the required processing time is 3 ms, then a data transmission may be sent in subframe n and the corresponding ACK/NACK may be sent in subframe n+k, where k>3. Table 2 lists the number of HARQ processes for the downlink and the number of HARQ processes for the uplink for each downlink-uplink configuration supported by LTE.

TABLE 2

Number of HARQ Processes

| DL:UL Configuration | DL:UL Allocation | Number of Downlink HARQ Processes | Number of Uplink HARQ Processes |
|---|---|---|---|
| 0 | 1 DL + DwPTS:3 UL | 4 | 7 |
| 1 | 2 DL + DwPTS:2 UL | 7 | 4 |
| 2 | 3 DL + DwPTS:1 UL | 10 | 2 |
| 6 | 3 DL + 2 DwPTS:5 UL | 6 | 6 |
| 3 | 6 DL + DwPTS:3 UL | 9 | 3 |
| 4 | 7 DL + DwPTS:2 UL | 12 | 2 |
| 5 | 8 DL + DwPTS:1 UL | 15 | 1 |

The number of ACKs and NACKs to send as feedback may be dependent on various factors such as the number of HARQ processes to acknowledge, the number of codewords sent in each HARQ process, whether to acknowledge a downlink assignment, etc. In one design, an eNB may send data on up to N HARQ processes to the UE, one HARQ process in each downlink subframe. In one design, the eNB may send (i) one codeword in each HARQ process with single-input multiple-output (SIMO) transmission or (ii) multiple codewords in each HARQ process with multiple-input multiple-output (MIMO) transmission. The codewords sent via a MIMO transmission may be mapped to layers, and the number of layers may be greater than or equal to the number of codewords. The eNB may thus send one or more codewords in each HARQ process. For example, a maximum of two codewords may be sent per MIMO transmission, and the UE may receive zero to 2N codewords in N downlink subframes. The UE may generate ACK information for all codewords and may send the ACK information in an uplink subframe of the next uplink transmission period.

In an aspect, a UE may bundle or combine ACKs and NACKs for multiple (K) codewords and may generate bundled ACK information for all K codewords. In one design, the UE may perform bundling with a logical AND operation on the ACKs and NACKs for all K codewords. The UE may generate (i) a bundled ACK if ACKs are obtained for all K codewords or (ii) a bundled NACK if a NACK is obtained for any one of the K codewords. The bundled ACK information for the K codewords may comprise a bundled ACK or a bundled NACK. The UE may also perform bundling in other manners. Bundling of ACKs and NACKs may reduce the amount of bundled ACK information by a factor of K.

An eNB may receive the bundled ACK information for the K codewords from the UE. If a bundled ACK is received, then the eNB may send the next set of codewords to the UE. Otherwise, if a bundled NACK is received, then the eNB may resend all K codewords since the eNB does not know which codewords were received in error by the UE.

In one design, the K codewords may be sent on up to K HARQ processes that may be started at the same time, e.g., in different downlink subframes of the same downlink transmission period. The K codewords may then be processed (e.g., encoded, interleaved, and modulated) by the eNB such that they have similar target termination. Target termination refers to the number of transmissions of a codeword needed to achieve a target probability of correct decoding of the codeword. The eNB may send a new set of codewords whenever a bundled ACK is received.

Bundling may be performed in various manners. In one design, bundling may be performed for ACKs and NACKs for all codewords received in one downlink subframe, e.g., for two codewords received via a MIMO transmission in one downlink subframe. In another design, bundling may be performed for ACKs and NACKs for codewords received in multiple downlink subframes, e.g., one codeword in each downlink subframe. In yet another design, bundling may be performed for ACKs and NACKs for codewords received in all downlink subframes of a downlink transmission period. In yet another design, bundling may be performed for ACKs and NACKs for codewords sent in the same layer across multiple downlink subframes. As an example, for a MIMO transmission of two codewords in each of N downlink subframes, one bundled ACK/NACK may be generated for codewords sent in the first layer in the N downlink subframes, and another bundled ACK/NACK may be generated for codewords sent in the second layer in the N downlink subframes. In general, bundling may be performed for any number of codewords received in any number of downlink subframes with or without MIMO.

The UE may receive $K_{total}$ codewords in N downlink subframes and may send bundled ACK information for these $K_{total}$ codewords in one uplink subframe. In one design, the UE may generate a single bundled ACK/NACK for all $K_{total}$ codewords, and the bundled ACK information may comprise the single bundled ACK/NACK. In another design, the UE may generate multiple bundled ACKs/NACKs for multiple sets of codewords formed with the $K_{total}$ codewords, one bundled ACK/NACK for each set of codewords. The bundled ACK information may then comprise the multiple bundled ACKs/NACKs. For example, nine codewords may be sent on nine HARQ processes in nine downlink subframes with downlink-uplink configuration 5 in Table 1. The UE may generate three bundled ACKs/NACKs, e.g., a first bundled ACK/NACK for the first three codewords, a second bundled ACK/NACK for the next three codewords, and a third bundled ACK/NACK for the last three codewords. As another example, four codewords may be sent on four HARQ processes in four downlink subframes with downlink-uplink configuration 4 or 5 in Table 1. The UE may generate two bundled ACKs/NACKs, e.g., a first bundled ACK/NACK for the first two codewords, and a second bundled ACK/NACK for the last two codewords.

In general, the bundled ACK information may comprise any number of bundled ACKs/NACKs, and each bundled ACK/NACK may be for any number of codewords. If multiple bundled ACKs/NACKs are sent, then each bundled ACK/NACK may cover the same number of codewords, or different bundled ACKs/NACKs may cover different numbers of codewords.

In one design, bundling of ACKs and NACKs may be static or semi-static and may be configured, e.g., by higher layer at call setup. In another design, bundling of ACKs and NACKs may be dynamic and may be configured, e.g., via signaling sent on the PDCCH by the physical layer or some other layer. For both designs, bundling may be dependent on various factors such as the downlink-uplink configuration, the amount of data to send on the downlink to the UE, whether or not MIMO is used for data transmission, quality-of-service (QoS) requirements of the data to send, the amount of resources available for sending ACK information on the uplink by ULs, the required processing time by the UEs, etc. For example, progressively more bundling may be used for progressively more asymmetric downlink-uplink configurations or for progressively more imbalance between the amount of data to send and the amount of resources available for ACK information.

In one design, the UE may send ACK information comprising one or more bundled ACKs/NACKs for $K_{total}$ codewords. In another design, the UE may send ACK information comprising a combination of bundled and individual ACKs/NACKs for $K_{total}$ codewords. Each bundled ACK/NACK may cover multiple codewords among the $K_{total}$ codewords. Each individual ACK/NACK may cover a single codeword among the $K_{total}$ codewords. For example, individual ACKs/NACKs may be used for certain types of data (e.g., delay sensitive data such as voice), and bundled ACKs/NACKs may be used for other types of data (e.g., delay tolerant data).

The eNB may encode a transport block of information bits in accordance with a forward error correction (FEC) code (e.g., a Turbo code) to obtain a codeword of systematic bits and parity bits. The systematic bits are the information bits in the transport block, and the parity bits are redundancy bits generated by the FEC code. The eNB may partition the codeword into multiple ($N_{RV}$) code blocks, which may be assigned redundancy versions (RVs) 0 to $N_{RV}-1$. The first code block with RV 0 may contain only or mostly systematic bits. Each subsequent code block with RV>0 may contain mostly or only parity bits, with different code blocks containing different parity bits. The eNB may send a downlink assignment on the PDCCH and a transmission of one code block on the PDSCH to the UE.

The UE may process the PDCCH to obtain the downlink assignment. If the UE receives the downlink assignment, then the UE may process the PDSCH in accordance with the downlink assignment to recover the codeword sent to the UE. If the UE does not detect the downlink assignment, then the UE may skip processing the PDSCH. The eNB may send the downlink assignment on the PDCCH to the UE, but the UE may miss the downlink assignment (e.g., decode the downlink assignment in error) and would not process the PDSCH. This scenario may be referred to as discontinuous transmission (DTX).

It may be desirable to distinguish between DTX and NACK. In this case, the feedback for the codeword may be one of the following:
DTX→the UE missed the PDCCH and did not receive the downlink assignment,
ACK→the codeword was decoded correctly, and
NACK→the codeword was decoded in error.

The eNB may resend the code block if a DTX is received from the UE and may send the next code block if a NACK is received. The eNB may thus send different code blocks depending on whether DTX or NACK is received. The eNB may send a code block for a new codeword if an ACK is received.

The eNB may send N code blocks with RV 0 for N codewords on the PDSCH in different downlink subframes and may send a downlink assignment on the PDCCH in each downlink subframe, e.g., as shown in FIG. 3. These N code blocks may include systematic bits for the N codewords. In each downlink subframe, the UE may process the PDCCH to detect for a downlink assignment and may process the PDSCH if a downlink assignment is received. The UE may generate and send a bundled ACK/NACK for all codewords received by the UE. The eNB may not know how many downlink assignments are received by the UE based on the bundled ACK/NACK. If the eNB receives a bundled NACK from the UE, then the eNB may have the following options:

1. Interpret the bundled NACK as comprising NACKs for all N codewords and send N code blocks with RV 1 to the UE, or
2. Interpret the bundled NACK as comprising DTXs for all N codewords and resend the N code blocks with RV 0 to the UE.

If the eNB implements option 1 and the UE actually missed the downlink assignments, then the UE would miss the N code blocks with RV 0 containing the systematic bits and may receive the N code blocks with RV 1 containing parity bits. Performance may be degraded by decoding the codewords with only the parity bits.

If the eNB implements option 2 and the UE actually received the downlink assignments, then the UE may receive the N code blocks with RV 0 containing the systematic bits twice. The eNB would then effectively transmit the codewords using a repetition code instead of a Turbo code, and performance may be degraded without the Turbo coding gain. The loss in coding gain and the corresponding loss in throughput may be more severe when ACKs and NACKs for a large number of codewords are bundled together, e.g., with the 9:1 configuration.

In another aspect, the eNB may generate code blocks in a manner to account for ambiguity between NACK and DTX due to bundling. In one design, to combat the possible loss in coding gain due to bundling of ACKs and NACKs, each code block of a codeword may be defined to include both systematic and parity bits. The eNB may generate $N_{RV}$ code blocks with RV 0 to $N_{RV}-1$. The first code block with RV 0 may contain only or mostly systematic bits. Each subsequent code block with RV>0 may contain both systematic and parity bits, with different code blocks containing different systematic bits and/or different parity bits. The percentage of systematic bits in each code block with RV>0 may be dependent on the tradeoff in performance degradation for the two scenarios described above. The eNB may then send a different code block for each transmission of the codeword. If the UE missed the downlink assignment, then the UE can receive systematic bits from a subsequent code block. If the UE received the downlink assignment but decoded the codeword in error, then the UE can receive parity bits from the subsequent code block.

LTE supports a number of PUCCH formats for sending uplink control information (UCI) such as ACK information on the PUCCH. Table 3 lists the PUCCH formats supported by LTE and provides the number of bits that can be sent in each uplink subframe for each PUCCH format.

TABLE 3

PUCCH Formats

| PUCCH Format | Number of bits per subframe |
|---|---|
| 1a | 1 |
| 1b | 2 |
| 2 | 20 |
| 2a | 21 |
| 2b | 22 |

PUCCH format 1a may be used to send one bit of ACK information for SIMO without bundling, e.g., one bit for ACK or NACK for one codeword. PUCCH format 1a may also be used to send one bundled ACK/NACK for multiple codewords, e.g., for all codewords received in one or more downlink subframes of a downlink transmission period.

PUCCH format 1b may be used to send two bits of ACK information for MIMO without bundling, e.g., one bit for ACK or NACK for each of two codewords sent with MIMO. PUCCH format 1b may also be used to send up to two bundled ACKs/NACKs for up to two sets of codewords, one bundled ACK/NACK for each set of codewords. Each set may include all codewords sent with MIMO. Each set may also include codewords sent in different downlink subframes. The amount of bundling may be dependent on the N:M configuration, the number of downlink subframes used for data transmission, the number of codewords sent in each downlink subframe, whether or not MIMO is employed, etc.

PUCCH formats 2, 2a and 2b may be used to send more than two bits of ACK information. For example, up to 14 bits of ACK information may be sent with PUCCH format 2, 2a or 2b with a code rate of 0.7 or lower. Fewer or more information bits may be sent with PUCCH formats 2, 2a and 2b with higher or lower code rates.

In one design, ACK information for all HARQ processes may be encoded jointly. For a SIMO transmission of one codeword per HARQ process, 14 information bits may be used to send:

DTX, ACK, or NACK for each of 8 HARQ processes, or
ACK or NACK for each of 14 HARQ processes.

Three values may be used for each HARQ process to convey ACK or NACK for one codeword or DTX. A total of $3^8$ values may be used for 8 HARQ processes and may be conveyed with 14 information bits, where $3^8 < 2^{14}$. Alternatively, two values may be used for each HARQ process to convey ACK or NACK for one codeword.

For a MIMO transmission of two codewords per HARQ process, 14 information bits may be used to send:

ACK or NACK for each codeword or DTX for each of 6 HARQ processes, or
ACK or NACK for each codeword for each of 7 HARQ processes.

Five values may be used for each HARQ process to convey ACKs for both codewords, NACKs for both codewords, ACK for the first codeword and NACK for the second codeword, NACK for the first codeword and ACK for the second codeword, or DTX. A total of $5^6$ values may be used for 6 HARQ processes and may be conveyed with 14 information bits, where $5^6 < 2^{14}$. Alternatively, four values may be used for each HARQ process and may convey ACK or NACK for each codeword.

In another design, ACK information for each HARQ process may be sent separately. For a SIMO transmission of one codeword per HARQ process, the ACK information for each HARQ process may be sent in one bit without DTX or in two bits with DTX. For a MIMO transmission of two codewords per HARQ process, the ACK information for each HARQ process may be sent in two bits without DTX or in three bits with DTX.

Other PUCCH formats beside those shown in Table 3 may also be used to carry ACK information for one or more bundled ACKs/NACKs. Signals for the PUCCH formats shown in Table 3 may be generated as described in 3GPP TS 36.211, entitled "Evolved Universal Terrestrial Radio Access (E-UTRA); Physical Channels and Modulation," which is publicly available.

In one design, bundling may be achieved by performing logical AND operation on the ACKs and NACKs for all codewords to be bundled, as described above. In another design, bundling may be achieved by mapping ACKs, NACKs and DTXs for all codewords to B bits of bundled ACK information based on a predetermined mapping, where $B \geq 1$. For example, a 3×3 table may be defined with three rows for DTX, ACK and NACK for a first codeword and three columns for DTX, ACK and NACK for a second codeword. Each of the nine entries in the table may be marked with one of $2^B$ possible values for the B bundled bits. For example, B may be equal to 2 for PUCCH format 1b, and each entry in the table may be marked with '00', '01', '10' or '11'. The mapping may be defined to achieve the desired bundling of ACKs, NACKs and DTXs for the two codewords. As another example, a 3×3×3 table may be defined for three codewords, and each of the 27 entries in the table may be marked with one of $2^B$ possible values for the B bundled bits. The mapping may be defined to achieve the desired bundling of ACKs, NACKs and DTXs for the three codewords.

Figures 4, 5:
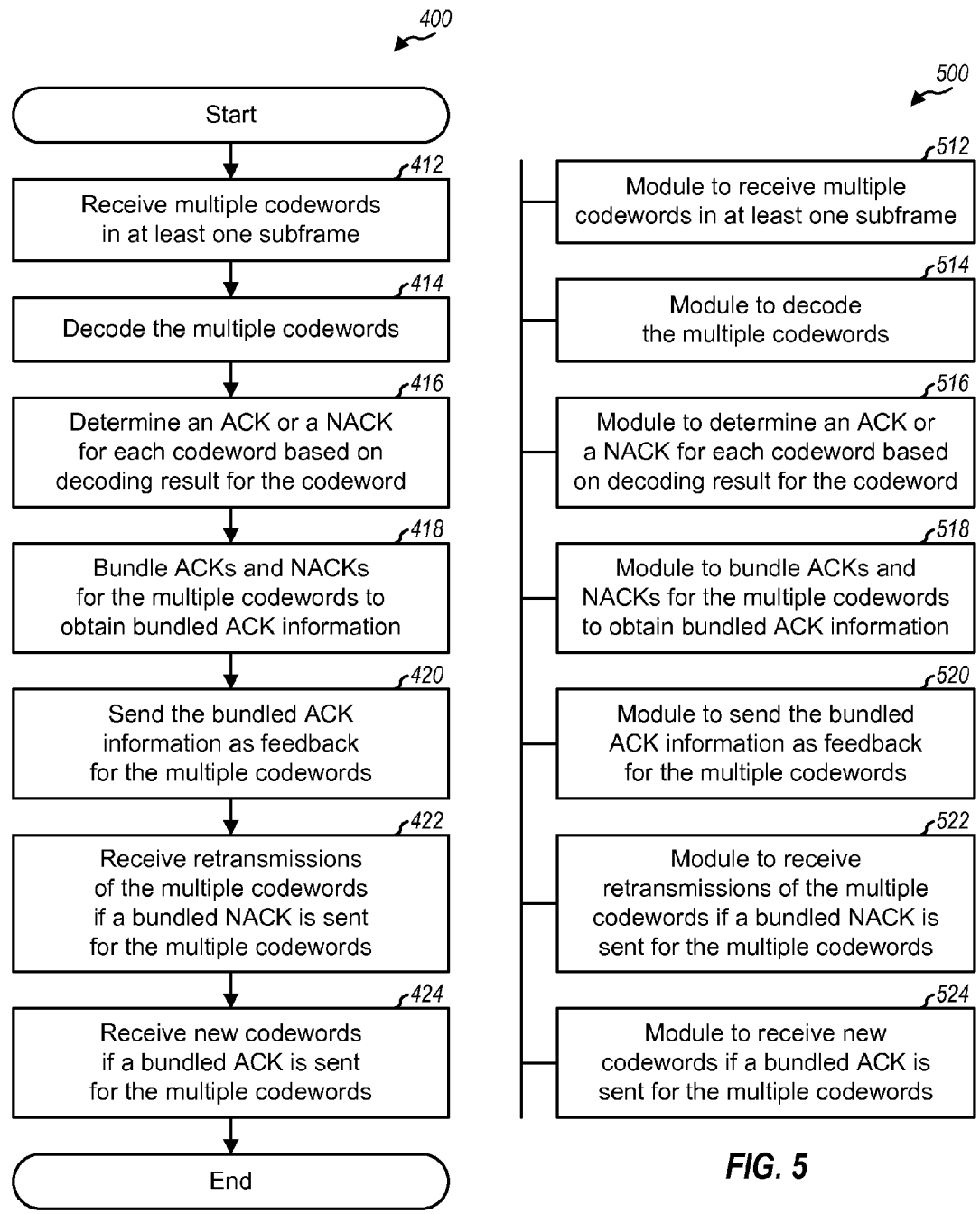
FIG. 4 shows a process for receiving data.
FIG. 5 shows an apparatus for receiving data.

FIG. 4 shows a design of a process 400 for receiving data in a wireless communication system. Process 400 may be performed by a receiver, which may be UE for data transmission on the downlink, a base station/eNB for data transmission on the uplink, or some other entity.

The receiver may receive multiple codewords in at least one subframe, e.g., receive transmissions of code blocks of a particular RV for the multiple codewords (block 412). The receiver may receive the multiple codewords (i) in multiple subframes, one codeword in each subframe, (ii) via a MIMO transmission in one subframe, (iii) via MIMO transmissions in multiple subframes, or (iv) via one or more transmissions in one or more subframes. In one design of data transmission on the downlink, the receiver may receive the multiple codewords in at least one downlink subframe in a TDD system with an asymmetric downlink-uplink configuration having more downlink subframes than uplink subframes. In one design of data transmission on the uplink, the receiver may receive the multiple codewords in at least one uplink subframe in a TDD system with more uplink subframes than downlink subframes. The receiver may receive the multiple codewords on at least one HARQ process, with all transmissions of each codeword being sent on one HARQ process.

The receiver may decode the multiple codewords (block 414) and may determine an ACK or a NACK for each codeword based on decoding result for the codeword (block 416). The receiver may bundle ACKs and NACKs for the multiple codewords to obtain bundled ACK information (block 418). The receiver may send the bundled ACK information as feedback for the multiple codewords (block 420). The receiver may send the bundled ACK information in an uplink subframe associated with the at least one downlink subframe in which the multiple codewords were received.

In one design, the bundled ACK information may comprise a single bundled ACK/NACK for the multiple codewords. In one design of block 418, the receiver may perform bundling based on a logical AND operation on the ACKs and NACKs for the multiple codewords. The receiver may generate (i) a bundled ACK if ACKs are obtained for all of the multiple codewords or (ii) a bundled NACK if a NACK is obtained for any one of the multiple codewords. In one design, the receiver may receive retransmissions of the multiple codewords if a bundled NACK is sent for the multiple codewords (block 422). The receiver may receive new codewords if a bundled ACK is sent for the multiple codewords (block 424).

In another design of block 418, the receiver may obtain ACK, NACK, or DTX for each of the multiple codewords. The receiver may then map the ACKs, NACKs and DTXs for the multiple codewords to multiple bits of the bundled ACK information based on a predetermined mapping. The receiver may also perform bundling in other manners.

In another design, the bundled ACK information may comprise multiple bundled ACKs/NACKs for multiple sets of codewords formed with the multiple codewords. Each bundled ACK/NACK may comprise a bundled ACK or a bundled NACK for one set of codewords. Each set may include (i) all codewords received in one subframe, (ii) codewords sent in one layer of MIMO transmissions received in multiple subframes, or (iii) codewords received in one or more subframes. The receiver may determine the bundled ACK/NACK for each set of codewords based on the ACKs and NACKs for the codewords in that set. The receiver may receive retransmission of each set of codewords for which a bundled NACK is sent. The receiver may receive a new set of codewords for each set of codewords for which a bundled ACK is sent.

In one design, the receiver may obtain a static or semi-static configuration for bundling ACKs and NACKs, e.g., from higher layers at the start of a call. The receiver may then perform bundling in accordance with the static or semi-static configuration. In another design, the receiver may obtain a dynamic configuration for bundling ACKs and NACKs for the multiple codewords, e.g., via signaling sent with the codewords. The receiver may then perform bundling in accordance with the dynamic configuration.

FIG. 5 shows a design of an apparatus 500 for receiving data in a wireless communication system. Apparatus 500 includes a module 512 to receive multiple codewords in at least one subframe, a module 514 to decode the multiple codewords, a module 516 to determine an ACK or a NACK for each codeword based on decoding result for the codeword, a module 518 to bundle ACKs and NACKs for the multiple codewords to obtain bundled ACK information, a module 520 to send the bundled ACK information as feedback for the multiple codewords, a module 522 to receive retransmissions of the multiple codewords if a bundled NACK is sent for the multiple codewords, and a module 524 to receive new codewords if a bundled ACK is sent for the multiple codewords.

Figure 6:
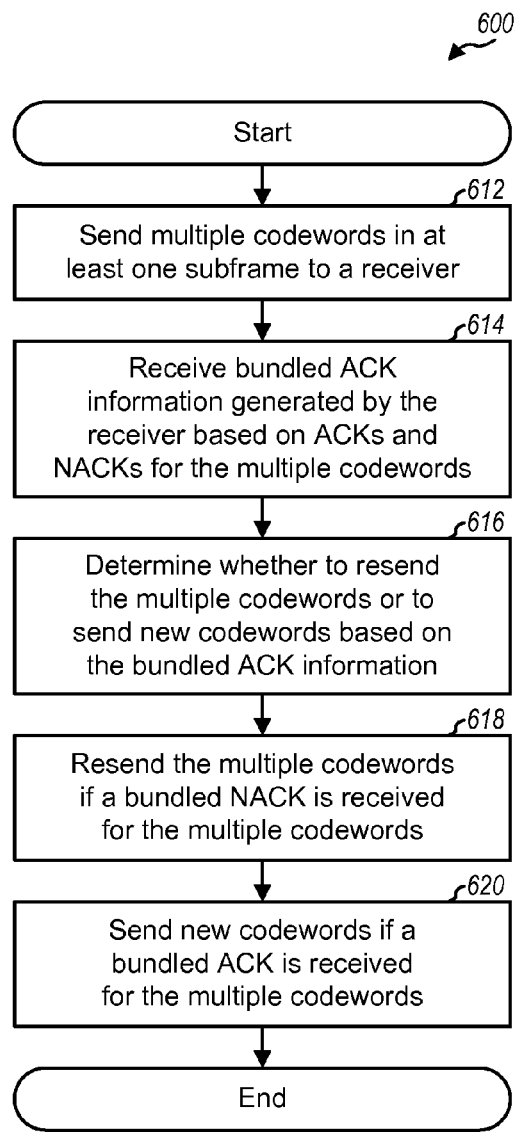
FIG. 6 shows a process for sending data.

FIG. 6 shows a design of a process 600 for sending data in a wireless communication system. Process 600 may be performed by a transmitter, which may be a base station/eNB for data transmission on the downlink, a UE for data transmission on the uplink, or some other entity.

The transmitter may send multiple codewords in at least one subframe to a receiver (block 612). The transmitter may send the multiple codewords (i) in multiple subframes, one codeword in each subframe, (ii) via a MIMO transmission in one subframe, (iii) via MIMO transmissions in multiple subframes, or (iv) via one or more transmissions in one or more subframes.

The transmitter may receive bundled ACK information generated by the receiver based on ACKs and NACKs for the multiple codewords (block 614). In one design, the transmitter may send the multiple codewords in at least one downlink subframe and may receive the bundled ACK information in an uplink subframe in a TDD system with an asymmetric downlink-uplink configuration having more downlink subframes than uplink subframes. In another design, the transmitter may send the multiple codewords in at least one uplink subframe and may receive the bundled ACK information in a downlink subframe in a TDD system with more uplink subframes than downlink subframes.

The transmitter may determine whether to resend the multiple codewords or to send new codewords based on the bundled ACK information (block 616). In one design, the bundled ACK information may comprise a single bundled ACK/NACK, which may be obtained by the receiver based on a logical AND of the ACKs and NACKs for the multiple codewords. The transmitter may resend the multiple codewords if a bundled NACK is received for the multiple codewords (block 618). In one design, each retransmission of a codeword may comprise systematic bits and parity bits for the codeword in order to mitigate performance degradation due to ambiguity between NACK and DTX with bundling. The transmitter may send new codewords if a bundled ACK is received for the multiple codewords (block 620).

In another design, the bundled ACK information may comprise multiple bundled ACKs/NACKs for multiple sets of codewords formed with the multiple codewords. The transmitter may resend each set of codewords for which a bundled NACK is received. The transmitter may send a new set of codewords for each set of codewords for which a bundled ACK is received.

Figure 7:
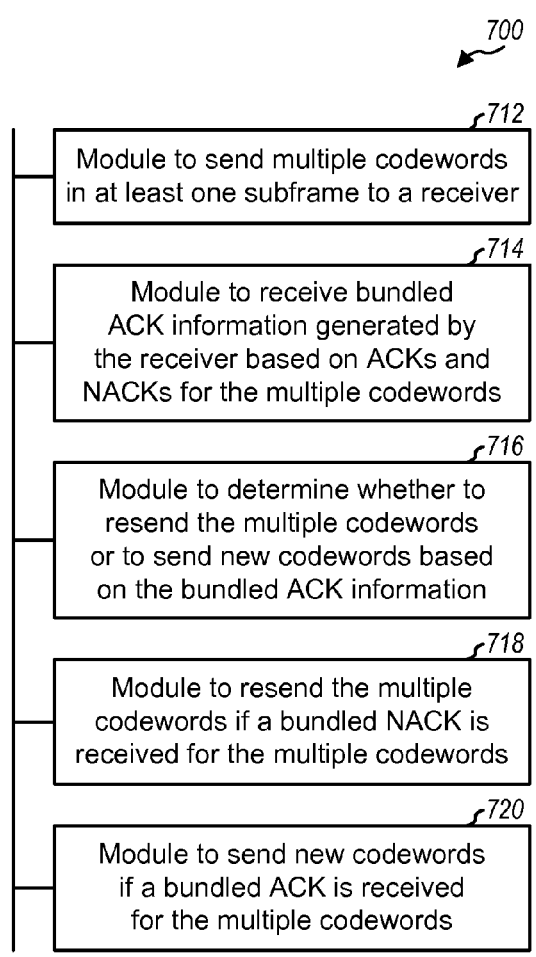
FIG. 7 shows an apparatus for sending data.

FIG. 7 shows a design of an apparatus 700 for receiving data in a wireless communication system. Apparatus 700 includes a module 712 to send multiple codewords in at least one subframe to a receiver, a module 714 to receive bundled ACK information generated by the receiver based on ACKs and NACKs for the multiple codewords, a module 716 to determine whether to resend the multiple codewords or to send new codewords based on the bundled ACK information, a module 718 to resend the multiple codewords if a bundled NACK is received for the multiple codewords, and a module 720 to send new codewords if a bundled ACK is received for the multiple codewords.

The modules in FIGS. 5 and 7 may comprise processors, electronics devices, hardware devices, electronics components, logical circuits, memories, software codes, firmware codes, etc., or any combination thereof.

Figure 8:
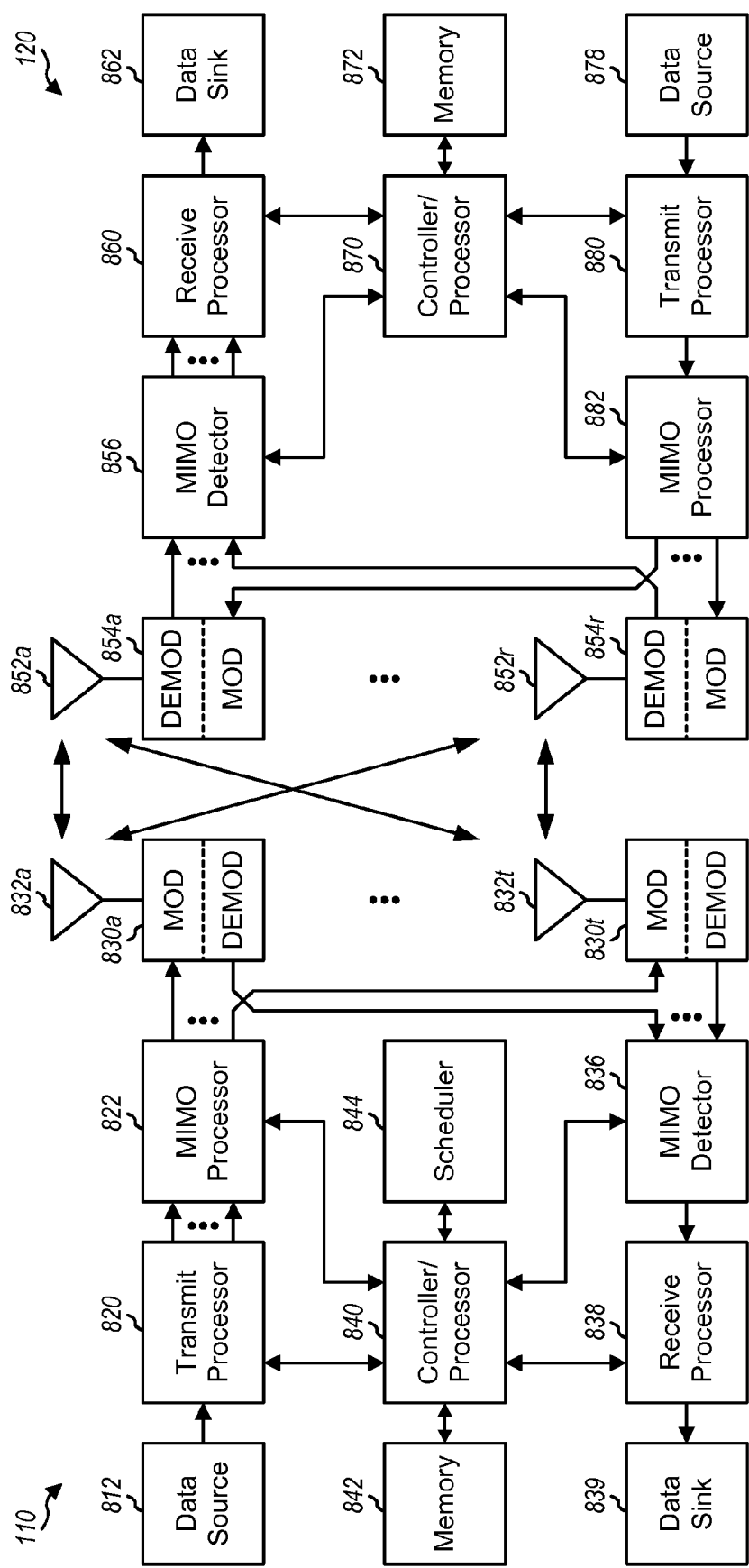
FIG. 8 shows a block diagram of a base station and a UE.

FIG. 8 shows a block diagram of a design of a base station/eNB 110 and a UE 120, which may be one of the base stations/eNBs and one of the UEs in FIG. 1. Base station 110 may be equipped with T antennas 832a through 832t, and UE 120 may be equipped with R antennas 852a through 852r, where in general $T \geq 1$ and $R \geq 1$.

At base station 110, a transmit processor 820 may receive data for one or more UEs from a data source 812, process (e.g., encode and modulate) the data for each UE, and provide data symbols for all UEs. Transmit processor 820 may also receive control information (e.g., downlink assignments) from a controller/processor 840, process the control information, and provide control symbols. Transmit processor 820 may also generate reference symbols for reference signals and may multiplex the reference symbols with the data symbols and the control symbols. A MIMO processor 822 may process (e.g., precode) the symbols from transmit processor 820 (if applicable) and provide T output symbol streams to T modulators (MOD) 830*a* through 830*t*. Each modulator 830 may process its output symbol stream (e.g., for OFDM) to obtain an output sample stream. Each modulator 830 may further condition (e.g., convert to analog, filter, amplify, and upconvert) its output sample stream to generate a downlink signal. T downlink signals from modulators 830*a* through 830*t* may be transmitted via T antennas 832*a* through 832*t*, respectively.

At UE 120, antennas 852*a* through 852*r* may receive the downlink signals from base station 110. Each antenna 852 may provide a received signal to an associated demodulator (DEMOD) 854. Each demodulator 854 may condition (e.g., filter, amplify, downconvert, and digitize) its received signal to obtain input samples and may further process the input samples (e.g., for OFDM) to obtain received symbols. A MIMO detector 856 may perform MIMO detection on the received symbols from all R demodulators 854*a* through 854*r* and provide detected symbols. A receive processor 860 may process (e.g., demodulate and decode) the detected symbols, provide decoded data for UE 120 to a data sink 862, and provide decoded control information to a controller/processor 870.

At UE 120, data from a data source 878 and control information (e.g., bundled ACK information) from controller/processor 870 may be processed by a transmit processor 880 and precoded by a MIMO processor 882 (if applicable) to obtain R output symbol streams. R modulators 854*a* through 854*r* may process the R output symbol streams (e.g., for SC-FDM) to obtain R output sample streams and may further condition the output sample streams to obtain R uplink signals, which may be transmitted via R antennas 852*a* through 852*r*. At base station 110, the uplink signals from UE 120 may be received by antennas 832*a* through 832*t*, conditioned and processed by demodulators 830*a* through 830*t*, and further processed by a MIMO detector 836 (if applicable) and a receive processor 838 to recover the data and control information sent by UE 120. Receive processor 838 may provide decoded data to a data sink 839 and provide decoded control information to controller/processor 840.

Controllers/processors 840 and 870 may direct the operation at base station 110 and UE 120, respectively. Processor 840 and/or other processors and modules at base station 110 may perform or direct process 400 in FIG. 4 for data transmission on the uplink, process 600 in FIG. 6 for data transmission on the downlink, and/or other processes for the techniques described herein. Processor 840 and/or other processors may bundle ACKs and NACKs for data transmission on the uplink. Processor 870 and/or other processors and modules at UE 120 may perform or direct process 400 in FIG. 4 for data transmission on the downlink, process 600 in FIG. 6 for data transmission on the uplink, and/or other processes for the techniques described herein. Processor 870 and/or other processors may bundle ACKs and NACKs for data transmission on the downlink. Memories 842 and 872 may store data and program codes for base station 110 and UE 120, respectively. A scheduler 844 may schedule UEs for data transmission on the downlink and/or uplink and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of receiving data in a wireless communication system, comprising:
   receiving signaling indicating a bundling configuration supported by higher layer for bundling acknowledgements (ACKs) or negative acknowledgements (NACKs);
   receiving multiple codewords in at least one subframe;
   decoding the multiple codewords;
   determining an ACK or NACK for each codeword based on decoding result for the codeword;
   bundling ACKs and NACKs for the multiple codewords to obtain bundled ACK information in accordance with the bundling configuration, each bundled ACK/NACK comprising a bundled ACK or a bundled NACK for one set of codewords;
   sending the bundled ACK information as feedback for the multiple codewords; and
   receiving retransmission of at least a subset of the multiple codewords for which a bundled ACK is not sent.

2. The method of claim 1, wherein the multiple codewords are received in at least one downlink subframe and the bundled ACK information is sent in an uplink subframe in a time division duplexed (TDD) system with an asymmetric downlink-uplink configuration having more downlink subframes than uplink subframes.

3. The method of claim 1, wherein the multiple codewords are received in multiple subframes, one codeword in each subframe.

4. The method of claim 1, wherein the multiple codewords are received via a multiple-input multiple-output (MIMO) transmission in one subframe.

5. The method of claim 1, wherein the bundling ACKs and NACKs for the multiple codewords comprises:
   generating a bundled ACK if ACKs are obtained for all of the multiple codewords, and
   generating a bundled NACK if a NACK is obtained for any one of the multiple codewords.

6. The method of claim 1, wherein the bundled ACK information comprises a multiple bundled ACKs/NACKs bundled ACK or a bundled NACK for the multiple codewords, the method further comprising:
   receiving retransmissions of the multiple codewords if a bundled NACK or individual NACK is sent for the multiple codewords; and
   receiving new codewords if a bundled ACK or individual ACK is sent for the multiple codewords.

7. The method of claim 1, wherein the bundling the ACKs and NACKs for the multiple codewords comprises determining the bundled ACK/NACK for each set of codewords based on ACKs and NACKs for the codewords in the set of codewords.

8. The method of claim 1, further comprising:
   receiving retransmission of each set of codewords for which a bundled NACK is sent; and
   receiving a new set of codewords for each set of codewords for which a bundled ACK is sent.

9. The method of claim 1, wherein each set of codewords is received in one subframe.

10. The method of claim 1, wherein each set of codewords comprises codewords sent in one layer of multiple-input multiple-output (MIMO) transmissions received in multiple subframes.

11. The method of claim 1, wherein the bundling ACKs and NACKs for the multiple codewords comprises:
    obtaining ACK, NACK, or discontinuous transmission (DTX) for each of the multiple codewords, and
    mapping ACKs, NACKs and DTXs for the multiple codewords to multiple bits of the bundled ACK information based on a predetermined mapping.

12. The method of claim 1, wherein the bundling configuration comprises at least one of a static or semi-static configuration.

13. An apparatus for wireless communication, comprising:
    at least one processor configured to receive signaling indicating a bundling configuration supported by higher layer for bundling acknowledgements (ACKs) or negative acknowledgements (NACKs), receive multiple codewords in at least one subframe, to decode the multiple codewords, to determine an ACK or NACK for each codeword based on decoding result for the codeword, to bundle ACKs and NACKs for the multiple codewords to obtain bundled ACK information in accordance with the bundling configuration, to send the bundled ACK information as feedback for the multiple codewords, and to receive retransmission of at least a subset of the multiple codewords for which a bundled ACK is not sent,
    each bundled ACK/NACK comprising a bundled ACK or a bundled NACK for one set of codeword.

14. The apparatus of claim 13, wherein the at least one processor is configured to generate a bundled ACK if ACKs are obtained for all of the multiple codewords, and to generate a bundled NACK if a NACK is obtained for any one of the multiple codewords.

15. The apparatus of claim 13, wherein the at least one processor is configured to receive retransmissions of the multiple codewords if a bundled NACK or individual NACK is sent for the multiple codewords, and to receive new codewords if a bundled ACK or individual ACK is sent for the multiple codewords.

16. The apparatus of claim 13, wherein the at least one processor is configured to receive retransmission of each set of codewords for which a bundled NACK is sent, and to receive a new set of codewords for each set of codewords for which a bundled ACK is sent.

17. The apparatus of claim 13, wherein the at least one processor is configured to obtain ACK, NACK, or discontinuous transmission (DTX) for each of the multiple codewords, and to map ACKs, NACKs and DTXs for the multiple codewords to multiple bits of the bundled ACK information based on a predetermined mapping.

18. The apparatus of claim 13, wherein the bundling configuration comprises at least one of a static or semi-static configuration.

19. An apparatus for wireless communication, comprising:
means for receiving signaling indicating a bundling configuration supported by higher layer for bundling acknowledgements (ACKs) or negative acknowledgements (NACKs);
means for receiving multiple codewords in at least one subframe;
means for decoding the multiple codewords;
means for determining an ACK or NACK for each codeword based on decoding result for the codeword;
means for bundling ACKs and NACKs for the multiple codewords to obtain bundled ACK information in accordance with the bundling configuration, each bundled ACK/NACK comprising a bundled ACK or a bundled NACK for one set of codewords;
means for sending the bundled ACK information as feedback for the multiple codewords; and
means for receiving retransmission of at least a subset of the multiple codewords for which a bundled ACK is not sent.

20. The apparatus of claim 19, wherein the means for bundling ACKs and NACKs for the multiple codewords comprises:
means for generating a bundled ACK if ACKs are obtained for all of the multiple codewords, and
means for generating a bundled NACK if a NACK is obtained for any one of the multiple codewords.

21. The apparatus of claim 19, wherein the bundled ACK information comprises a bundled ACK or a bundled NACK for the multiple codewords, the apparatus further comprising:
means for receiving retransmissions of the multiple codewords if a bundled NACK or individual NACK is sent for the multiple codewords; and
means for receiving new codewords if a bundled ACK or individual ACK is sent for the multiple codewords.

22. The apparatus of claim 19, further comprising:
means for receiving retransmission of each set of codewords for which a bundled NACK is sent; and
means for receiving a new set of codewords for each set of codewords for which a bundled ACK is sent.

23. The apparatus of claim 19, wherein the means for bundling ACKs and NACKs for the multiple codewords comprises:
means for obtaining ACK, NACK, or discontinuous transmission (DTX) for each of the multiple codewords, and
means for mapping ACKs, NACKs and DTXs for the multiple codewords to multiple bits of the bundled ACK information based on a predetermined mapping.

24. A computer program product, comprising:
a non-transitory computer-readable medium comprising:
code for causing at least one computer to receive signaling indicating a bundling configuration supported by higher layer for bundling acknowledgements (ACKs) or negative acknowledgements (NACKs);
code for causing at least one computer to receive multiple codewords in at least one subframe,
code for causing the at least one computer to decode the multiple codewords,
code for causing the at least one computer to determine an ACK or NACK for each codeword based on decoding result for the codeword,
code for causing the at least one computer to bundle ACKs and NACKs for the multiple codewords to obtain bundled ACK information in accordance with the bundling configuration, each bundled ACK/NACK comprising a bundled ACK or a bundled NACK for one set of codewords,
code for causing the at least one computer to send the bundled ACK information as feedback for the multiple codewords, and
code for causing the at least one computer to receive retransmission of at least a subset of the multiple codewords for which a bundled ACK is not sent.

25. A method of sending data in a wireless communication system, comprising:
sending signaling indicating a bundling configuration supported by higher layer for bundling acknowledgements (ACKs) or negative acknowledgements (NACKs);
sending multiple codewords in at least one subframe to a receiver;
receiving bundled ACK information generated by the receiver in accordance with the bundling configuration based on ACKs and NACKs for the multiple codewords, each bundled ACK/NACK comprising a bundled ACK or a bundled NACK for one set of codewords; and
resending at least a subset of the multiple codewords for which a bundled ACK is not received.

26. The method of claim 25, wherein the multiple codewords are sent in at least one downlink subframe and the bundled ACK information is received in an uplink subframe in a time division duplexed (TDD) system with an asymmetric downlink-uplink configuration having more downlink subframes than uplink subframes.

27. The method of claim 25, wherein the multiple codewords are sent in multiple subframes, one codeword in each subframe.

28. The method of claim 25, wherein the multiple codewords are sent via a multiple-input multiple-output (MIMO) transmission in one subframe.

29. The method of claim 25, wherein the bundled ACK information comprises a bundled ACK if ACKs are obtained by the receiver for all of the multiple codewords or a bundled NACK if a NACK is obtained by the receiver for any one of the multiple codewords.

30. The method of claim 25, further comprising:
resending the multiple codewords if a bundled NACK or individual NACK is received for the multiple codewords; and
sending new codewords if a bundled ACK or individual ACK is received for the multiple codewords.

31. The method of claim 25, wherein the resending the at least a subset of the multiple codewords comprises
sending a retransmission of each codeword comprising systematic bits and parity bits for the codeword.

32. The method of claim 25, further comprising:
resending each set of codewords for which a bundled NACK is received; and
sending a new set of codewords for each set of codewords for which a bundled ACK is received.

33. The method of claim 25, wherein the bundling configuration comprises at least one of a static or semi-static configuration.

34. An apparatus for wireless communication, comprising:
at least one processor configured to send signaling indicating a bundling configuration supported by higher layer for bundling acknowledgements (ACKs) or negative acknowledgements (NACKs), to send multiple codewords in at least one subframe to a receiver, to receive bundled ACK information generated by the receiver in accordance with the bundling configuration based on ACKs and NACKs for the multiple codewords, and to resend at least a subset of the multiple codewords for which a bundled ACK is not received, each bundled ACK/NACK comprising a bundled ACK or a bundled NACK for one set of codewords.

35. The apparatus of claim 34, wherein the bundled ACK information comprises a bundled ACK or a bundled NACK for the multiple codewords, and wherein the at least one processor is configured to resend the multiple codewords if a bundled NACK or individual NACK is received, and to send new codewords if a bundled ACK or individual ACK is received.

36. The apparatus of claim 34, wherein the at least one processor is configured to resend each set of codewords for which a bundled NACK is received, and to send a new set of codewords for each set of codewords for which a bundled ACK is received.

* * * * *